United States Patent Office 3,832,265
Patented Aug. 27, 1974

3,832,265
BALLISTIC ARMOR OF PLIES OF NYLON FABRIC
AND PLIES OF GLASS FABRIC
Maurice R. Denommee, Franklin, Mass., assignor to the United States of America as represented by the Secretary of the Army
No Drawing. Filed Sept. 20, 1973, Ser. No. 399,772
Int. Cl. D03d 11/00
U.S. Cl. 161—92                                    7 Claims

ABSTRACT OF THE DISCLOSURE

An armor material formed of a plurality of plies of woven nylon ballistic fabric and a plurality of plies of woven roving fiberglass fabric bonded together with a polyester resin to produce a dimensionally stable, lightweight, ballistic-resistant material.

The invention described herein may be manufactured, used and licensed by or for the Government for governmental purposes without the payment to me of any royalty thereon.

BACKGROUND OF THE INVENTION

This invention relates to a ballistic-resistant armor material, and more particularly to a lightweight laminate having exceptional resistance to small grain, high velocity missiles.

In the field of body armor, reliance has traditionally been placed on the use of metals or metal alloys to provide protection against ballistic missiles and fragments. Metallic materials, however, while capable of affording the required degree of protection, have certain inherent disadvantages, the most notable of which are the heavy weight burden, inflexibility, thermal and electrical conductivity and lack of buoyancy in the water. Studies have been made of non-metallic systems in an attempt to produce a material or combination of materials which are at least equal in protective properties to metal armor and avoid one or more of the disadvantages of such metal armor. To the present time, the most promisnig non-metallic armor system has been a laminate of woven fibrous materials, e.g., either a glass or a synthetic fiber fabric impregnated with a modified phenolic resin to cause adherence of the plies of the fabric in normal use but to permit delamination upon impact by a ballistic missile. The theory being that the energy of the missile or fragment is dissipated in delaminating and stretching the individual plies of the laminate. To date, studies of various armor materials have established that the resistance to ballistic penetration is more or less a function of the areal density of the material (the weight of the material per unit area). The armor material described herein, however, because of a novel and unusual combination of materials results in a laminate that provides greater ballistic protection than would have been expected merely from a consideration of its areal density.

SUMMARY OF THE INVENTION

The present invention is for a lightweight, dimensionally stable, ballistic-resistant armor laminate having an unexpectedly high level of resistance to small grain, high velocity missiles. The armor laminate consists of a plurality of plies of woven nylon ballistic fabric and woven roving fiberglass fabric bonded together with a polyester resin. The laminate is constructed so that the plies of one fabric constituting the interior portion of the laminate are surrounded on opposite sides thereof by one or more plies of the other fabric, with the number of plies of the latter fabric being equal in number on each side thereof. A small amount of methacrylic acid added to the polyester resin substantially improves the laminate integrity (bonding) of the cured laminate.

DESCRIPTION OF THE PREFERRED EMBODIMENTS

The ballistic-resistant material of this invention is a polyester impregnated laminate containing a combination of plies of ballistic nylon fabric and plies of woven roving, fiberglass fabric. The resulting laminate surprisingly exhibits greater ballistic resistance than can be obtained with laminates of equivalent areal density employing either of the two fabrics alone. It appears that the unexpectedly superior ballistic-resistant properties of the laminate of this invention, is due in part to the combination of the two different fabric materials employed and to the nature of the impregnating material. As compared with various other types of non-metallic armor material of similar areal density, the armor laminate of this invention is highly effective in defeating small grain, high velocity missiles. "Small grain" refers to missiles having a weight of less than 25 grains and "high velocity" refers to projectile speeds of 750 feet per second or higher. When formed or molded into a desired shape, this laminate exhibits a high degree of dimensional stability, i.e., the ability to resist changes in shape upon aging or exposure to high temperatures and moisture.

The laminate of this invention is constructed of two different fabric plies, nylon and fiberglass, which will be defined in detail hereinafter. Any number of plies may be employed to achieve the desired level of ballistic protection, however, it is essential that the laminate be of balanced construction, i.e., having the same number of plies of one fabric located on opposite sides of the interior portion of the laminate which is constructed of the other fabric. As an example, the laminate may be constructed of two plies of fabric A— four plies of fabric B—two plies of fabric A; three plies of fabric B—three plies of fabric A—three plies of fabric B, in every case there being the same number of plies of one fabric on either side of the plies of the other fabric.

One of the fabric materials employed herein is a woven ballistic nylon fabric, a material known in the art and commercially available and described in U.S. Pat. No. 3,320,619. This fabric is formed by weaving a high tenacity, continuous filament nylon prepared from hexamethylenediamine and adipic acid or its derivatives and having a melting point 250°±6° C. The warp and filling yarns are 1050 denier, multifilament and three to four turns per inch Z twist and the weave is a 2 x 2 basket weave with two ends weaving as one and two picks weaving as one. The cloth is thoroughly scoured and heat treated and has a minimum breaking strength in the warp of 900 lbs. and in the filling of 825 lbs. and a minimum ultimate elongation of 25% in the warp and in the filling. Further details relative to this nylon ballistic cloth may be found in Military Specification MIL–C–12369D, entitled "Cloth, Ballistic, Nylon" which is incorporated herein by reference.

The other fabric material used herein is a woven, roving, glass fabric manufactured from continuous glass roving in a plain weave pattern having a weight of 24 oz. per sq. yd. The roving is formed of continuous filament, undyed, electric glass having a starch-oil size. The glass fiber diameter is 0.00050 inch and the thread counts per inch in the warp is 5 and in the filling is 4 (2 picks per shed). The yarn size in the warp is 32±2 ends of 75—1/0 and in the filling is 15±2 ends of 75—1/0. This fabric has a nominal average thickness of 0.040±10% inches and the breaking strength in pounds per inch of width in the warp is at least 1000 and in the filling is at least 800. Reference is also made to ASTM D2150–63T, Woven Roving Glass Fabric for Polyester Glass Laminates (incorporated herein by reference), for additional information with respect to woven, roving glass fabrics.

The third component of the laminate is a liquid bonding resin which is subsequently heat cured to a solid state and consists of a solution of unsaturated polyesters in monomeric styrene and contains from 0.5% to 1.0% methacrylic acid. Suitable polyester resins are well known and readily available. In general, they are additive type resins formed by the reaction of polycarboxylic acids and polyols. Resins which meet the foregoing description include the Paraplex P resins, a product of Rohm and Haas Co., Philadelphia, Pennsylvania, and essentially noteworthy is a blend of three parts of Paraplex P–43 and one part Paraplex P–13. Physical properties of this cured resin blend include a modulous of elasticity of 315,000 p.s.i., ultimate strength of 11,500 p.s.i. and an Izod Notched Impact of 0.42 per lb./inch Notch. Polyester resin suitable for use herein include any unsaturated resin soluble in styrene and curable to a solid state at temperatures less than 300° F. having a modulus of elasticity of at least 200,000 p.s.i., and an ultimate strength of 7500 p.s.i. Suitable resins conform to Military Specification, MIL–R–7575 entitled "Resin, Polyester, Low Pressure Laminated Grade A, Class I and II" (incorporated herein by reference). The polyester resin shall contain from 70% to 85% by weight of thermosetting polyester content and from 15% to 30% by weight of monomeric styrene.

In constructing the laminate, the individual plies of fabric material are coated on each side with sufficient polyester resin solution to produce a laminate containing from 20% to 25% by weight of polyester resin. After the resin-coated plies are stacked together in the desired arrangement, they are inserted in a mold and heated to a temperature of from 270° F. to 300° F. to cure the resin and subjected to a pressure of from 50 p.s.i. to 300 p.s.i. to obtain a dense laminate and to obtain the desired configuration. While the timing required to cure will vary with the resin and thickness of the laminate, it will generally range from about 5 minutes to about 30 minutes. Any molding system capable of applying heat and pressure in the ranges set forth above may be used in forming the laminate. Following are several examples detailing the construction of certain laminates according to this invention and the relative performance of these laminates as compared with other materials.

EXAMPLE I

A laminate is constructed having the following arrangement of fabric plies; two outer plies of woven roving fiberglass fabric, four inner plies of nylon fabric and two outer plies of fiberglass fabric. The fiberglass fabric is a 24 oz./yd.$^2$ woven roving, fiberglass fabric having a starch-oil size and the nylon fabric is a 14 oz./yd.$^2$ ballistic nylon fabric. Each ply of fabric material is coated on each side with a blend consisting of three parts of Paraplex P–43 and one part of Paraplex P–13 polyester resin (60% polyester resin solids in a styrene solvent) containing 1% by weight of methacrylic acid. The amount of resin add-on is about 25% by weight. After the coated plies are stacked together in the above-described order, they are placed in a conventional heating pressure mold to form a flat laminate. The plies within the mold are heated to a temperature of 270° F. and subjected to a pressure of 200 p.s.i. for eight minutes. Exposure of the cured laminate to high temperatures and humidity (80° F. and 50% RH) for 49 hours failed to produce any distortion in the laminate indicating a good bond between the resin and the fabric layers. Ballistic testing of the laminate demonstrated outstanding protection against two grain, cube missiles.

EXAMPLE II

A helmet shell was constructed of two plies of nylon fabric, three plies of fiberglass ballistic and two plies of nylon fabric. The fabric materials, the same as those employed in Example I, were counted on both sides with the same resin used in Example I. The polyester resin add-on was 25% by weight. The resin coated plies were arranged in a helmet mold and heated to a temperature of 280° F. and held at 50 p.s.i. for 12 minutes. The cured helmet was subjected to a temperature of 90° and 60% RH for one week without distortion of the helmet shape. Adhesion between the plies was found to be excellent. Ballistic resistance was found to be good for both two grain and the sixteen grain, cube missiles.

EXAMPLE III

The flat laminate of Example I was compared for ballistic protection with flat laminates formed in the same manner but using only one or other of the fabric materials in making up the laminate. Nine inch square sections of each of the three different laminates (Example I, ballistic nylon, and fiberglass) having approximately the same areal density (10.8) were fired at 0° obliquity using two grain cubes and sixteen grain cubes. Results established that the inventive laminate of Example I had a $V_{50}$ that was 16% greater than the all nylon laminate and 41% greater than the fiberglass fiber laminate using the two grain cube. When tested with the sixteen grain cube, the laminate of Example I had a $V_{50}$ that was 3% greater than the nylon laminate and 52% greater than the fiberglass fabric. These results demonstrate the significantly superior protection afforded by the laminate of this invention over similar laminates of the same areal density employing either woven roving fiberglass or nylon fabrics alone. $V_{50}$ is defined herein as the impact velocity at which there is a 50% probability of penetration by the missile.

The invention described in detail in the foregoing specification is susceptible to changes and modifications as may occur to persons skilled in the art without departing from the principle and spirit thereof. The terminology used is for purposes of description and not of limitation, the scope of the invention being defined in the claims.

I claim:

1. A dimensionally stable, ballistic-resistant armor laminate structure comprising
    a plurality of plies of woven fabric material bonded together by polyester resin,
    with the inner plies of said laminate being a different fabric material than that of the external plies on either side thereof and said external plies constructed of the same fabric material and being equal in number on each side of said inner plies,
    said woven fabric materials selected from nylon ballistic fabric and woven roving, fiberglass fabric and said polyester resin containing from 0.5% to 1.0% by weight of methacrylic acid.

2. A dimensionally stable, ballistic-resistant armor laminate structure according to claim 1 containing from 20% to 25% by weight of polyester resin.

3. A dimensionally stable, ballistic-resistant armor laminate structure according to claim 2 wherein said polyester resin comprises from 70% to 80% by weight of thermosetting polyester and from 15% to 30% by weight of monomeric styrene.

4. A dimensionally stable, ballistic-resistant armor laminate structure according to claim 3 wherein said external plies are woven roving fiberglass fabric and said interior plies are nylon ballistic fabric.

5. A dimensionally stable, ballistic-resistant armor laminate structure according to claim 4 having at least two external plies on either side of the interior plies and having at least four interior plies.

6. A dimensionally stable, ballistic-resistant armor laminate structure according to claim 5 wherein said polyester resin is a solution of unsaturated polyesters in monomeric styrene.

7. A dimensionally stable, ballistic-resistant armor laminate structure according to claim 6 wherein said nylon ballistic fabric is a 2 x 2 basket weave fabric, weighing about 14 oz. per square yard, having a minimum of 42 yarns per inch in the filling and warp wherein said woven roving fiberglass fabric has a plain weave pattern woven from continuous filament glass weighing about 24 oz. per square yard.

References Cited

UNITED STATES PATENTS

| | | | |
|---|---|---|---|
| 3,320,619 | 5/1967 | Lastnik | 161—404 X |
| 3,722,355 | 3/1973 | King | 161—404 X |

MARION E. McCAMISH, Primary Examiner

U.S. Cl. X.R.

2—2.5; 161—93, 193, 194, 197, 227, 404